Figure 1:
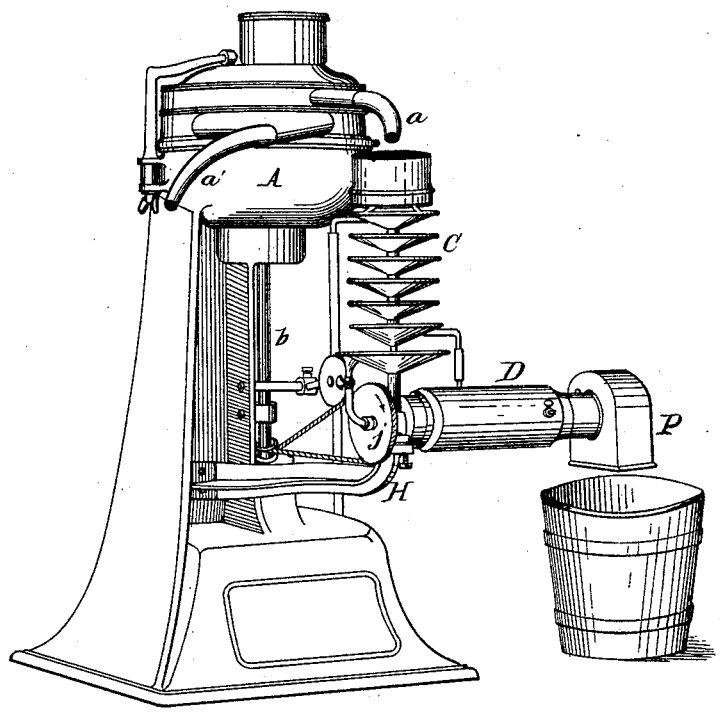

(No Model.) 3 Sheets—Sheet 1.

C. G. P. DE LAVAL.
METHOD OF SEPARATING BUTTER FROM MILK.

No. 484,916. Patented Oct. 25, 1892.

WITNESSES:
Thos. L. Popp.
Emil Neuhart

INVENTOR:
Carl Gustaf Patrik de Laval.
By Edward Wilhelm
Attorney (No Model.)　　　　　　　　　　　　　　　3 Sheets—Sheet 2.
C. G. P. DE LAVAL.
METHOD OF SEPARATING BUTTER FROM MILK.
No. 484,916.　　　　　　　　　Patented Oct. 25, 1892.
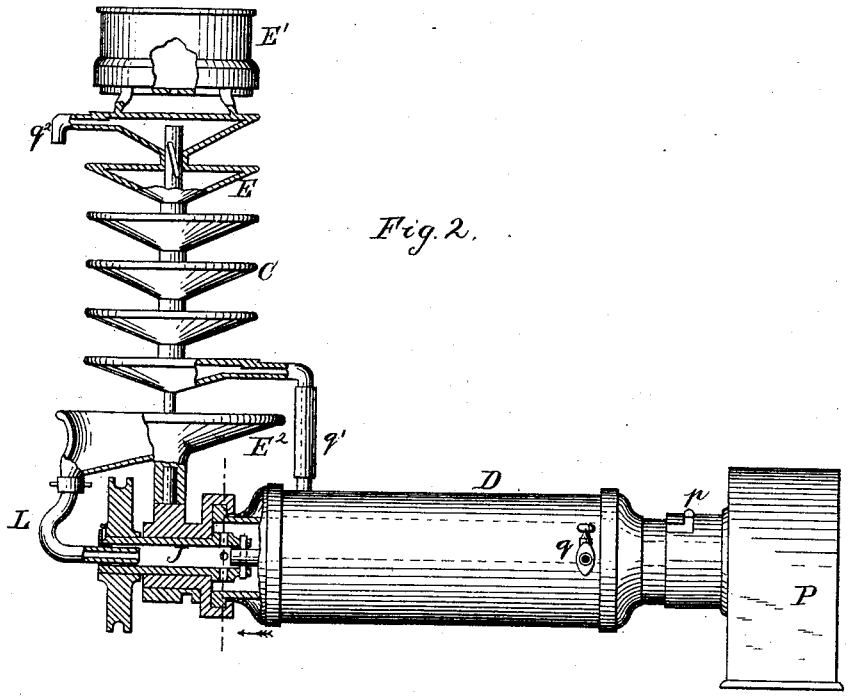
Fig. 2.
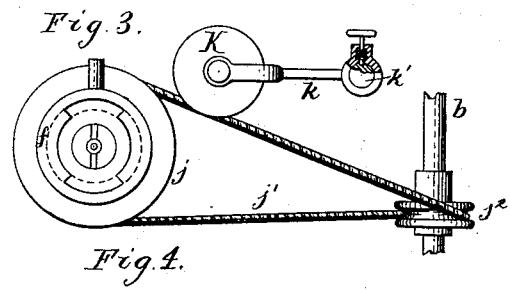
Fig. 3.
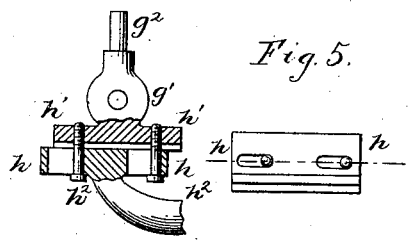
Fig. 4.
Fig. 5.
Witnesses
Theo. L. Popp.
Emil Neuhart
Carl Gustaf Patrik de Laval,
Inventor.
By Edward Wilhelm
Attorney.

(No Model.) 3 Sheets—Sheet 3.
C. G. P. DE LAVAL.
METHOD OF SEPARATING BUTTER FROM MILK.
No. 484,916. Patented Oct. 25, 1892.
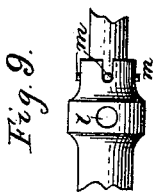
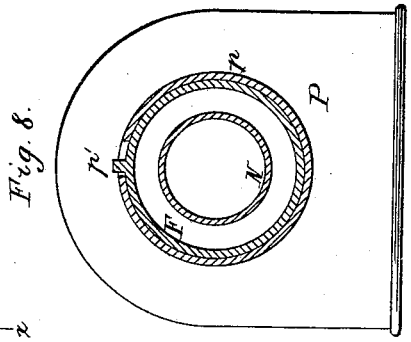
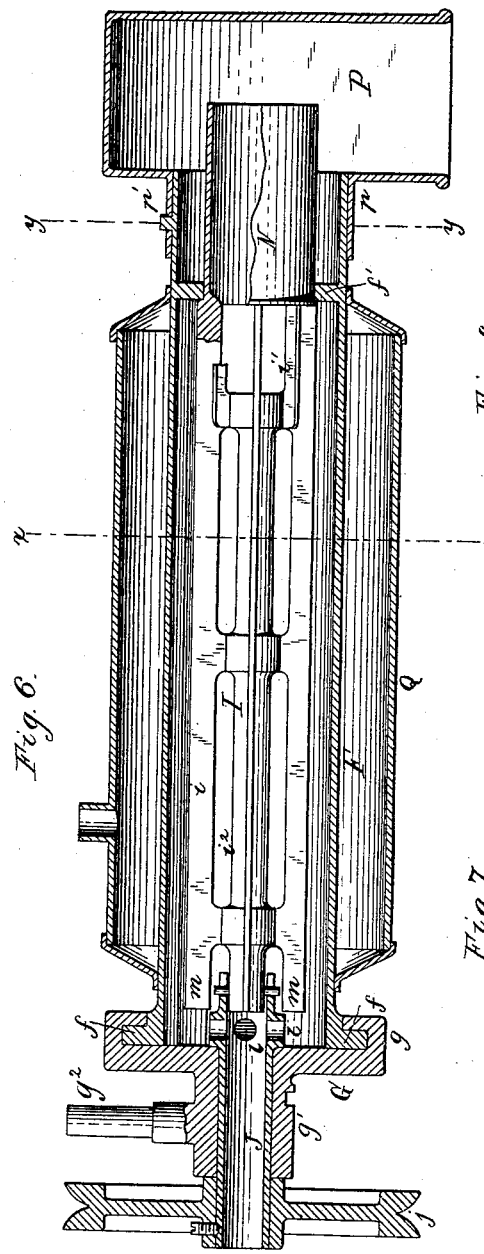
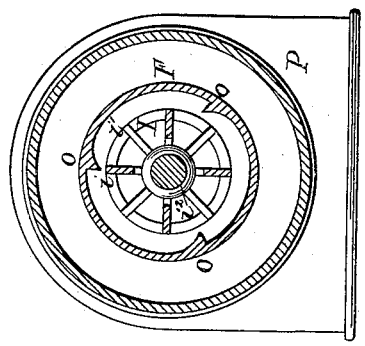
Witnesses:
Theo. L. Popp.
Emil Neuhart.
Inventor:
Carl Gustaf Patrik de Laval,
By Edward Wilhelm.
Attorney.

UNITED STATES PATENT OFFICE.

CARL GUSTAF PATRIK DE LAVAL, OF STOCKHOLM, SWEDEN, ASSIGNOR TO THE AKTIEBOLAGET SEPARATOR, OF SAME PLACE.

METHOD OF SEPARATING BUTTER FROM MILK.

SPECIFICATION forming part of Letters Patent No. 484,916, dated October 25, 1892.

Application filed April 22, 1890. Serial No. 348,999. (No model.)

*To all whom it may concern:*

Be it known that I, CARL GUSTAF PATRIK DE LAVAL, a citizen of the Kingdom of Sweden, and a resident of the city of Stockholm, Sweden, have invented a new and useful Improvement in the Method of Separating Butter from Milk, of which the following is a specification.

This invention relates to the separation of butter-fat from milk by a continuous process. The usual method of separating the butter-fat from the blue milk with which it is mixed in milk and cream consists in subjecting a certain quantity or charge of cream in a churn to a suitable agitation, which can be produced in a great variety of ways. By this method the entire charge of cream is treated at the same time, and when the operation is finished the entire product of butter and buttermilk is removed. It has been proposed to first separate the cream from the bulk of the blue milk in a centrifugal separator, then to remove the accumulated cream to a cooler, and then to return the cooled cream to the separator, which has in the meantime been provided with a dasher for churning the cream. This operation is intermittent, as the centrifugal creamer is used alternately as a separator and as a churn. It has also been proposed to separate the cream from the bulk of the blue milk by centrifugal action in a centrifugal separator and to churn the separated cream at the same time by a dasher, with which the separator is provided, so that the machine discharges the blue milk and the butter separately and continuously. In this method no provision can be made for maintaining different temperatures for creaming and churning. In order to obtain the greatest yield of cream by centrifugal separation, the temperature of the milk should be about 85° Fahrenheit unless the milk is separated immediately after it is drawn from the cow, when the temperature may be higher. In order to obtain the greatest yield of butter from the cream, the temperature of the cream should be 56° to 62° Fahrenheit. When the centrifugal separation and the churning are carried on simultaneously, only one temperature can be maintained, which if proper for creaming is improper for churning, and vice versa, and if an average temperature is maintained it is improper for both operations.

One object of my invention is a continuously-operating process by which the proper temperatures for creaming and churning can be maintained.

Another object of my invention is to avoid the presence of a large volume of cream in the churn at a time and to contrive a continuous churn in such manner that the separation begins at the inlet end of the churn and is completed when the material reaches the outlet end, so that a continuous discharge of accretions of butter and churn milk takes place.

In the accompanying drawings, consisting of three sheets, Figure 1 is a perspective view of the apparatus by which my invention can be practiced. Fig. 2 is a sectional elevation, on an enlarged scale, of the cooler and churn. Fig. 3 is an elevation of the belt-drive by which the churn-dasher is driven from the spindle of the centrifugal separator. Fig. 4 is a fragmentary sectional elevation of the arm by which the churn is supported. Fig. 5 is a top plan view thereof. Fig. 6 is a longitudinal section of the churn on an enlarged scale. Figs. 7 and 8 are cross-sections in lines $x\,x$ and $y\,y$, Fig. 6, respectively. Fig. 9 is a fragmentary elevation of the dasher-coupling.

Like letters of reference refer to like parts in the several figures.

A represents a centrifugal separator of any well-known or suitable construction, and $a\,a'$, respectively, the discharge-pipes for the separated cream and skim-milk.

$b$ represents the spindle of the separator, which is rotated by any suitable means.

C represents a cooler, which receives the cream from the separator and reduces the temperature thereof to that which is best suited for churning.

D represents the continuous churn, which receives the cream from the cooler.

I prefer to employ the cooler represented in the drawings; but any other suitable cooling apparatus may be employed.

The cooler represented in the drawings is composed of a series of superposed hollow sections E of inverted-cone shape, a feed-cup E', which rests on the top section, and a receiver E², which is arranged below the cooling-sections. The feed-cup rests on a rim having a vertical flange to retain the cup in a central position and legs secured to the top section and has an opening in its bottom, through which the cream flows upon the horizontal upper surface of the top section. The cream flows over the edge of the section in a thin film and clings to the tapering lower surface of the section, along which it flows to the next following section, and so on downwardly over all the sections of the cooler until it reaches the receiver E². In flowing over the sections the cream is cooled by cold water circulating through the said sections and is at the same time thoroughly aerated by being exposed to the air in thin films.

F represents the cylindrical shell of the churn, provided at its front end with outwardly-turned segmental flanges $f$ and near its rear end with an inwardly-projecting flange $f'$.

G represents the head, which closes the front end of the shell and which is provided with an internally-grooved flange $g$, having segmental openings, through which the flanges $f$ can be inserted into the groove, in which they are secured by a short turning movement. The head G is provided with a forwardly-extending sleeve $g'$, which is secured to an arm H, projecting from the frame of the centrifugal separator. This arm is provided with laterally-extending ears $h$ and the sleeve with similar ears $h'$, which are secured to the ears $h$ by screws $h^2$, passing through elongated holes in the lower ears, so that the churn can be adjusted toward and from the spindle of the separator. The sleeve $g'$ is provided on its upper side with an upwardly-projecting stud $g^2$, upon which the receiver E² rests.

I represents the dasher, arranged axially in the cylindrical shell F and composed of a suitable number of beaters $i\, i'$, which are secured to a shaft $i^2$. I prefer to employ four beaters in the front portion of the dasher and eight beaters in the rear portion thereof in order to increase the agitation and finish the butter before the product is discharged from the shell.

J represents a hollow shaft, which is journaled in the head G and sleeve $g'$ and which projects with its outer end beyond the sleeve and with its inner end into the shell of the churn. The outer end of the hollow shaft is provided with a grooved pulley $j$, around which runs a belt $j'$, which connects this pulley with a pulley $j^2$ on the separator-spindle, whereby the hollow shaft is rotated. The proper tension is applied to this belt by a tightener-pulley K, which is attached to an arm $k$. The latter is adjustably mounted on a pivot-pin $k'$, projecting from the frame of the separator.

L represents a feed-pipe by which the cooled cream is conducted from the receiver E² to the hollow shaft. This pipe has a screw-coupling at its upper end, by which it is attached to the nipple of the receiver, and enters with its lower end the bore of the hollow shaft J. The latter is provided within the shell and near the front head G with lateral outlet-openings $l$, through which the cream passes from the bore of the shaft into the shell. The hollow shaft extends inwardly beyond these outlet-openings and receives in its inner portion the front end of the dasher-shaft $i^2$, which is provided with laterally-projecting pins $m$. The end of the hollow shaft is provided with notches which receive these pins, whereby the dasher-shaft is rotated from the hollow shaft. The dasher-shaft extends rearwardly to the front portions of the rear beaters $i'$, which are arranged between the main beaters $i$. The rear end of the dasher is provided with a tubular extension N, which is journaled in the flange $f'$ at the rear end of the shell and through which the butter and churn-milk are discharged.

O represents ribs or fixed beaters arranged longitudinally on the inner side of the shell F for the purpose of increasing the effect of the dasher.

P represents a hood, which incloses the discharge end of the shell and which opens downwardly, so as to prevent scattering of the butter and churn-milk and conduct the product to a pail or other suitable receptacle. This hood is provided at its front side with a collar $p$, which fits over the rear end of the shell of the churn and is attached thereto by a pin $p'$ on the churn entering an L-shaped notch in the collar.

Q represents a water-jacket, which surrounds the shell F for the purpose of carrying off the heat which is generated in churning. This jacket receives a supply of cold water from a pipe $q$ at its rear end and delivers the water from its front end by a pipe $q'$ to the lowest section of the cooler. The water passes upwardly through the cooling-sections and escapes from the top section through a pipe $q^2$.

The operation of the apparatus is as follows: The full milk, having a temperature of about 85° Fahrenheit, is fed continuously into the centrifugal separator, in which the full milk is separated into cream and skim-milk and from which the cream passes in a continuous stream through the pipe $a$ to the cooler C. The latter is so supplied with water that the temperature of the cream is reduced to about 56° Fahrenheit. The rapid motion of the churn-dasher raises the temperature of the cream during the operation of churning several degrees, so that the butter issues from the churn at a temperature of about 62° Fahrenheit. In a churn of two and one-half inches internal diameter the dasher makes about three thousand revolutions per minute. The cream passes from the cooler into the hollow inlet-shaft of the churn, and thence into the shell of the churn, in which it is subjected to a violent beating action while moving from the inlet to the outlet end of the churn. The volume of cream which is operated upon at a time is very small, whereby the cushioning effect of a large volume of liquid is avoided and the cream-globules are thoroughly subjected to the action of the beaters. This enables the beaters to reach all the butter-globules which are contained in the cream and prevents any butter-globules from remaining suspended in the churn-milk or buttermilk. The yield of butter is thereby proportionately increased and the churn-milk or buttermilk is rendered poorer. The inwardly-projecting flange $f'$, near the rear end of the shell, retains the butter and churn-milk in the shell until a sufficient volume has accumulated to pass inwardly to the discharge-tube N, through which the accretions of butter and churn-milk are discharged into the hood. The rotation of the discharge-tube subjects the mixture of butter accretions and churn-milk to centrifugal action, whereby larger aggregations of the lumps of butter are formed and the churn-milk is still further separated from the butter. The cold water circulating through the jacket surrounding the shell of the churn prevents undue rise of the temperature by the action of the beaters and facilitates the coalescence of the globules of butter-fat. The constant supply of cream at the receiving end of the churn causes the material to move through the churn, thereby maintaining incipient and progressive separations of the cream into butter and churn-milk while the material is in transit through the churn, the separation being completed when the material reaches the discharge end. The product consisting of accretions of butter and churn-milk is discharged into a suitable receptacle. The churn-milk is afterward separated from the butter by draining or filtering.

I do not wish to claim in this application the apparatus by which this invention is practiced, as the same is claimed in another application of even date herewith.

I do not wish to claim in this application the herein-described method of continuous churning, because it is claimed in my renewed application filed December 19, 1890, Serial No. 375,186.

I claim as my invention—

1. The herein-described method of obtaining butter, which consists in subjecting a continuous current of cream to the action of a cooling agent and subjecting the cooled cream to continuous agitation while passing from the inlet to the outlet of the churn and discharging the product composed of butter and churn-milk continuously from the churn, substantially as set forth.

2. The herein-described method of obtaining butter from milk, which consists in continuously separating the cream from the blue milk, thereby establishing a continuous current from the separator to the final receiver, subjecting the continuous current of separated cream to the action of a cooling agent, and finally subjecting the current of cooled cream to continuous agitation, whereby a continuous product of butter is obtained, substantially as set forth.

In testimony that I claim the foregoing as my invention I have signed my name, in presence of two witnesses, this 14th day of October, 1889.

CARL GUSTAF PATRIK DE LAVAL.

Witnesses:
NERE A. ELFWING,
A. W. ALMQVIST.